United States Patent [19]

Cobb et al.

[11] E Re. 30,769

[45] Reissued Oct. 13, 1981

[54] MOUNTING ARRANGEMENT FOR IMPACT ROCK-BREAKER

[75] Inventors: Delwin E. Cobb, Peoria; Jerry D. Fidler, East Peoria, both of Ill.; Nathan Gutman, Simsbury, Conn.; Richard E. Livesay, Peoria, Ill.; Gerald P. Simmons, Washington, Ill.; Orrin A. Stemler, East Peoria, Ill.

[73] Assignee: Caterpillar Tractor Co., Peoria, Ill.

[21] Appl. No.: 70,934

[22] Filed: Aug. 29, 1979

Related U.S. Patent Documents

Reissue of:

[64] Patent No.: 3,915,501
Issued: Oct. 28, 1975
Appl. No.: 526,280
Filed: Nov. 22, 1974

[51] Int. Cl.[3] ..... E02F 3/96

[52] U.S. Cl. ..... 299/67; 37/117.5; 37/DIG. 18; 173/43; 173/46; 414/724

[58] Field of Search ..... 299/37, 67, 70; 173/46, 173/43; 37/117.5, DIG. 18; 414/688, 724, 725

[56] References Cited

U.S. PATENT DOCUMENTS

| | | | |
|---|---|---|---|
| 1,067,375 | 7/1913 | Proctor | 299/67 |
| 2,969,844 | 1/1961 | Hamrick | 173/46 |
| 3,097,439 | 7/1963 | Calkin | 37/117.5 |
| 3,233,687 | 2/1966 | Grimes | 173/46 X |
| 3,779,408 | 12/1973 | Ivie | 37/117.5 X |
| 3,854,608 | 12/1974 | Arnold | 37/117.5 X |

FOREIGN PATENT DOCUMENTS

| | | | |
|---|---|---|---|
| 2194849 | 3/1974 | France | 299/67 |

*Primary Examiner*—Ernest R. Purser
*Attorney, Agent, or Firm*—William B. Heming

[57] ABSTRACT

An impact rock breaker includes detachable mounting means and latching means operative to mount the rock breaker on the stick of a backhoe or excavator adjacent the bucket such that the rock breaker can be pivoted between a non-operative position out of the way of the bucket to permit normal operation of the bucket and an operative position latched to the bucket for movement with the bucket for normal operation of the rock breaker.

29 Claims, 6 Drawing Figures

MOUNTING ARRANGEMENT FOR IMPACT ROCK-BREAKER

Matter enclosed in heavy brackets [ ] appears in the original patent but forms no part of this reissue specification; matter printed in italics indicates the additions made by reissue.

BACKGROUND OF THE INVENTION

The present invention relates to excavating apparatus and particularly to an impact rock-breaking apparatus for mounting on an excavator or backhoe.

When undertaking excavating work such as with backhoes or excavators, it is frequently necessary to carry out distinct phases of the operation requiring different tools. For example, when excavating with a backhoe or excavator one may encounter hard rock formations or concrete which requires breaking up before it can be removed. Such situations may require that a jackhammer or similar tool be moved to break up the rock or concrete in order that it may be removed from the excavation. Frequently, however the rock or concrete cannot be reached by or is inaccessible to a jackhammer.

Rock-breaking tools for mounting on the end of the boom or stick of an excavator or backhoe are known. Such tools, however, generally require that the bucket be removed in order that the rock-breaking tools can be attached to the stick of the excavator. This approach is extremely time-consuming and expensive.

Another approach to this problem has been providing the excavator bucket with vibrating teeth for breaking the rock or concrete. The major problem with this approach is that such apparatus is generally incapable of developing sufficient force to efficiently break concrete and other hard rock-materials.

Another approach to this problem is such as disclosed in British specification 1,172,537 published Dec. 3, 1969. That specification discloses an arrangement having two separate booms and an arrangement wherein a bucket and a rock-breaking device are both mounted on the same arm of an excavator. The bucket is slidably mounted on the arm to swing or slide into and out of operative position. The problem with this arrangement is that it requires complicated and expensive apparatus and the bucket suffers in strength and durability.

SUMMARY AND OBJECTS OF THE INVENTION

It is, therefore, a primary object of the present invention to provide a machine capable of performing multiple types of operations with a minimal amount of time required switching from one operation to another.

Another object of the present invention is to provide a material-fracturing apparatus for mounting on the stick of an excavator without interfering with the use of the bucket of the excavator.

A further object of the present invention is to provide a rock-breaking apparatus that is attachable to the stick of an excavator or backhoe in a manner to permit normal operation of both the backhoe and the bucket.

In accordance with the primary aspect of the present invention, a rock-breaking apparatus is pivotally secured at a common pivot point with the bucket of an excavator and is swingable and latchable into an operating position and latchable into a non-operating position to permit normal operation of the bucket of the machine.

BRIEF DESCRIPTION OF THE DRAWINGS

The above and other objects and advantages of the present invention will become apparent from the following description when read in conjunction with the accompanying drawings wherein.

DETAILED DESCRIPTION OF THE PREFERRED EMBODIMENT

Figure 1:
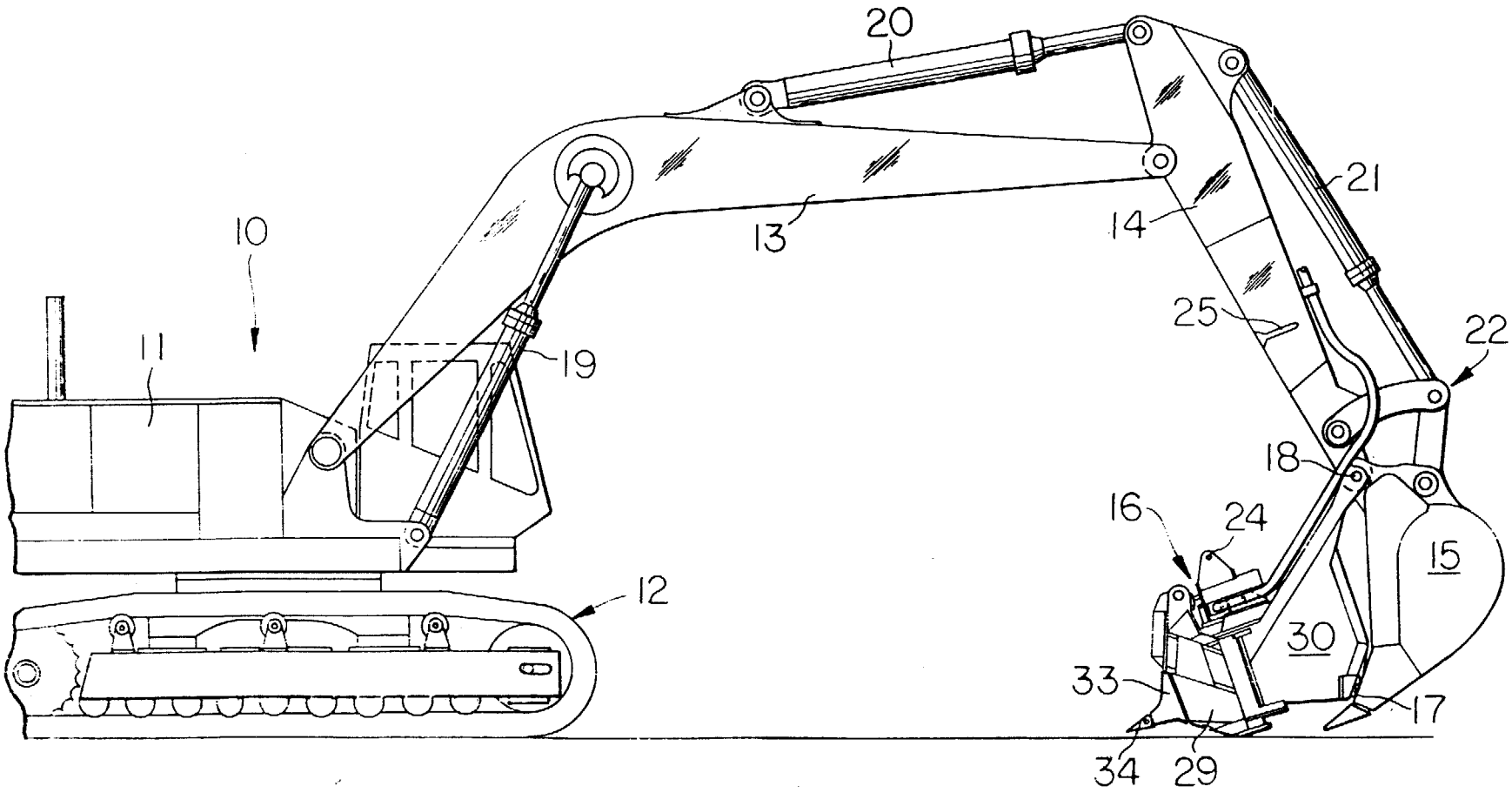
FIG. 1 is an elevational view of an excavator machine embodying an apparatus of the present invention.

Referring now to the drawings, particularly to FIG. 1, there is illustrated a hydraulic excavator disignated generally by the numeral 10 which includes an upper structure 11 rotatably mounted on a lower structure including movable endless track assemblies 12. A boom 13 is pivotally mounted at its inner end in the usual manner to the upper structure 11 and pivotally supports a stick or an arm 14 at its outer end. A bucket 15 is pivotally supported on the outer end of the stick 14.

A material-fracturing or rock-breaking apparatus in accordance with the present invention is generally designated by the numeral 16 and is pivotally mounted about the same pivot point 18 as that of the bucket 15. Suitable first latching means 17 is provided for latching the apparatus to the bucket 15 for movement therewith in the operative position.

The boom 13 is controlled in the usual manner by means of a pair of cylinders 19, and the stick 14 is similarly controlled by means of a hydraulic cylinder 20. A hydraulic cylinder 21 is pivotally connected at its upper end to the stick 14 and at its lower end to wrist linkage 22 which in turn is connected to the bucket 15 for movement of the bucket about its pivot point 18.

Figure 2:
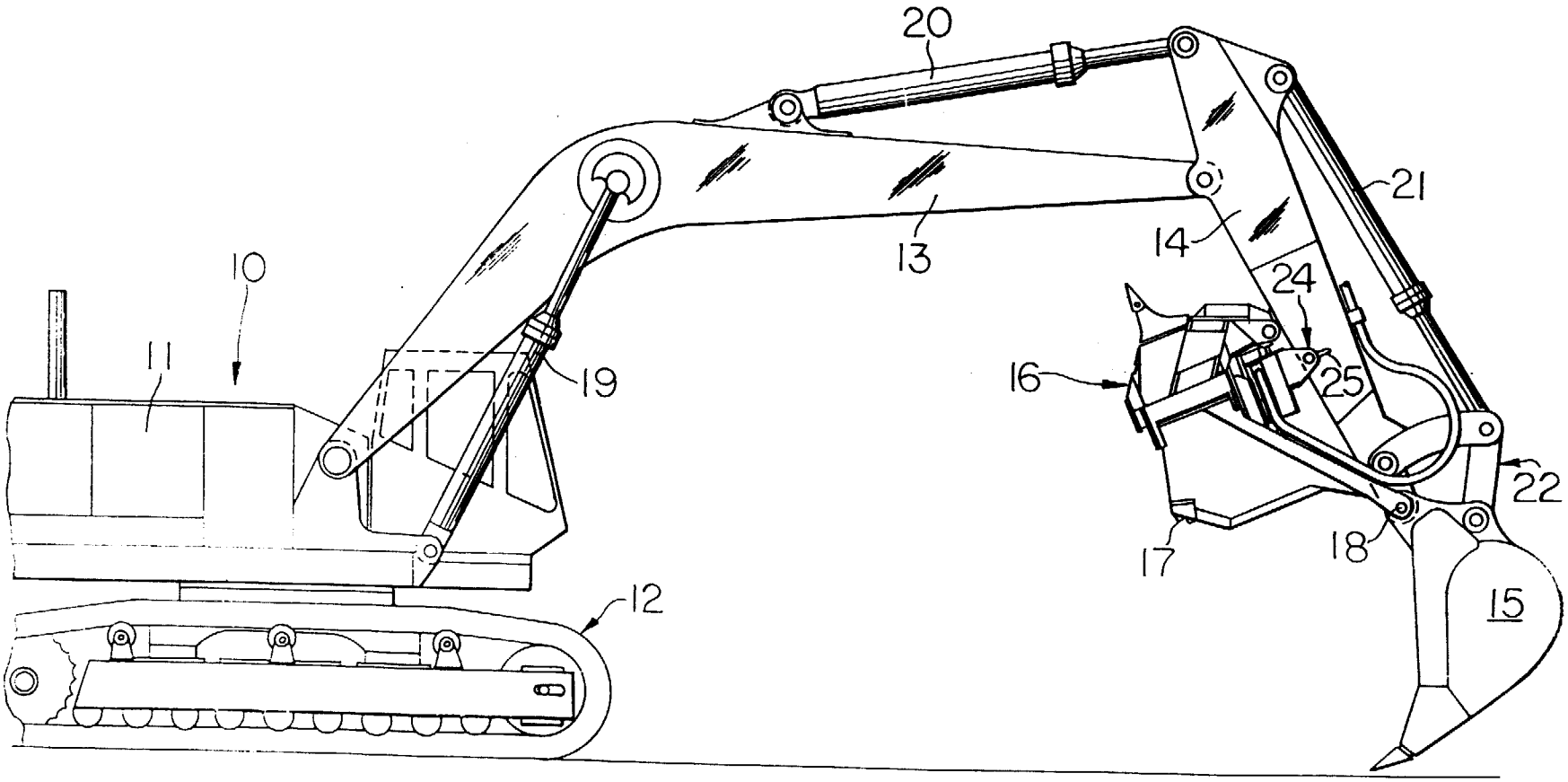
FIG. 2 is a view like FIG. 1 with the apparatus of the present invention latched in a non-operative position.

The apparatus includes second latch means, including suitable latch mechanism 24, engaging in a latch slot 25 formed in the stick 15 for retaining or holding the apparatus in a position as shown in FIG. 2 to permit normal operation of the bucket 15. The latch 17 holds the apparatus latched to bucket 15 as shown in FIG. 1 for movement therewith. When the apparatus is latched into the position as shown in FIG. 2, the bucket 15 is free to function in the normal manner. Latching the mechanism in the position as shown in FIG. 2 is accomplished by curling the bucket 15 upwards against the stick until the latch mechanism 24 engages the slot 25, at which time the latch mechanism is actuated, securing the materialfracturing apparatus into the position as shown in FIG. 2. The latch mechanism 17 is then unlocked from bucket 15, permitting the bucket to swing away for use in the normal manner.

Figure 3:
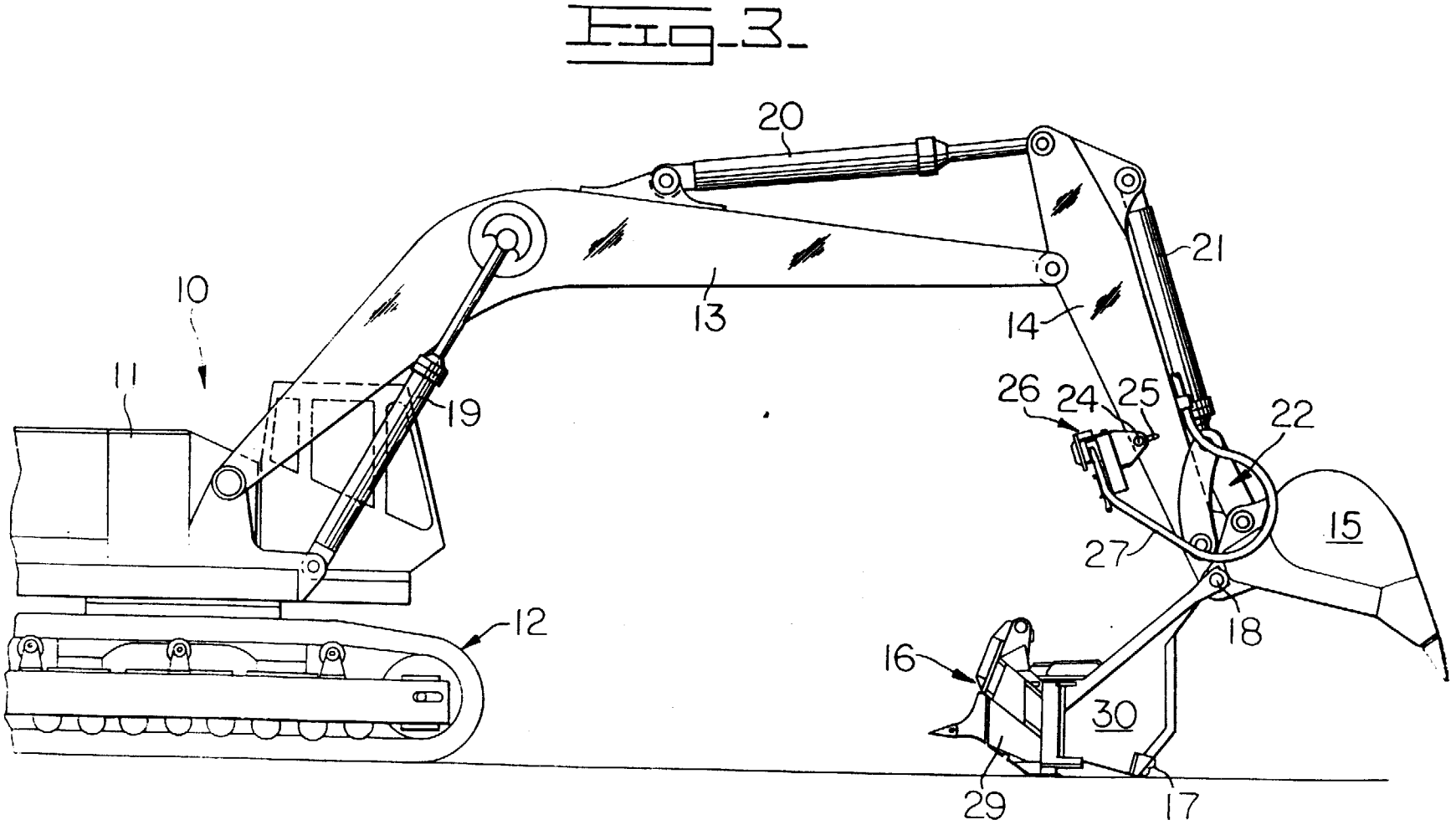
FIG. 3 is a view like FIG. 1 with the apparatus of the present invention moved to a position preparatory to removal thereof.

Turning now to FIG. 3, there is illustrated the fracturing apparatus in a position to be removed or detached from the excavator. The material-fracturing device preferably includes a mechanism of the type shown in either one of U.S. application Ser. Nos. 390,911 entitled Eccentric Ring Impacting Mechanism or 390,912 entitled Impact Material Fracturing Device for Excavators and the Like both filed Aug. 23, 1973 of common assignment herewith, which are rotary impact devices and are preferably driven by rotary hydraulic motors. With the present arrangement, the hydraulic motor is constructed as a sub-assembly generally designated by the numeral 26 and is readily detachable from the main housing and frame assembly of the fracturing apparatus. With such an arrangement the hydraulic motor sub-assembly 26 can be left latched in the position as shown in FIG. 3 and detached from the remainder of the assembly, permitting the fracturing apparatus housing and support frame to fall away as shown, so that it can be readily removed simply by removing bearing caps 18a from pivot pins 18. This leaves the hydraulic lines 27 for supplying fluid to the motor 26 intact without requiring them to be uncoupled therefrom. This arrangement permits ready detachment of the fracturing apparatus without the possibility of contamination of the hydraulic oil supply. Such contamination would be possible if the hydraulic lines were required to be removed and capped upon removal of the assembly.

The apparatus can be reattached to the excavator simply by reversing the above process.

Figure 4:
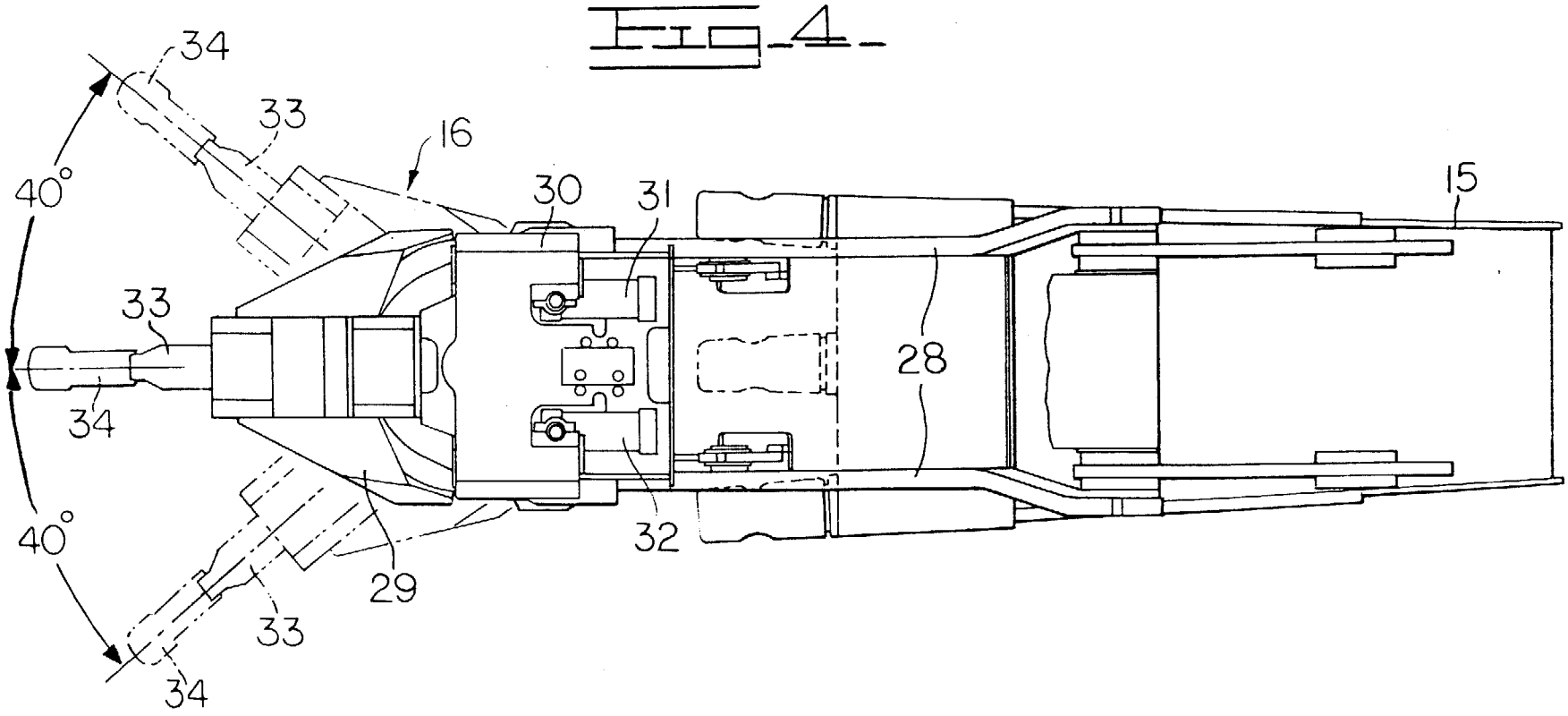
FIG. 4 is a plan view of the apparatus of the present invention.

Turning now to FIG. 4, wherein the device or apparatus is illustrated in a plan view, a housing 29 which encloses and mounts the drive shaft, flywheels and other related internal components, is rotatably supported by means of a main support member 30 and is adjustable with respect thereto by means of a pair of hydraulic cylinders 31 & 32. The internal mechanism of the impact material-fracturing apparatus including the fracturing shank 33 and fracturing tip 34 are similar to those disclosed in application Ser. No. 390,911 pointed out above.

As best illustrated in FIG. 4, the fracturing shank and mechanism is rotatable 40° to either side of its zero position. This selective adjustment is an important consideration when digging a trench through rock or hard substances. The apparatus is capable of forming a trench with fairly vertical walls by rotating the cutting tool from side to side. The housing portion 29 is pivoted with respect to the support structure 30 about a substantially vertical axis. A pair of brackets 28 extend backward at approximately 45° with respect to this axis and are pivotally connected by means of the pin 18 to the stick 14.

Figure 5:
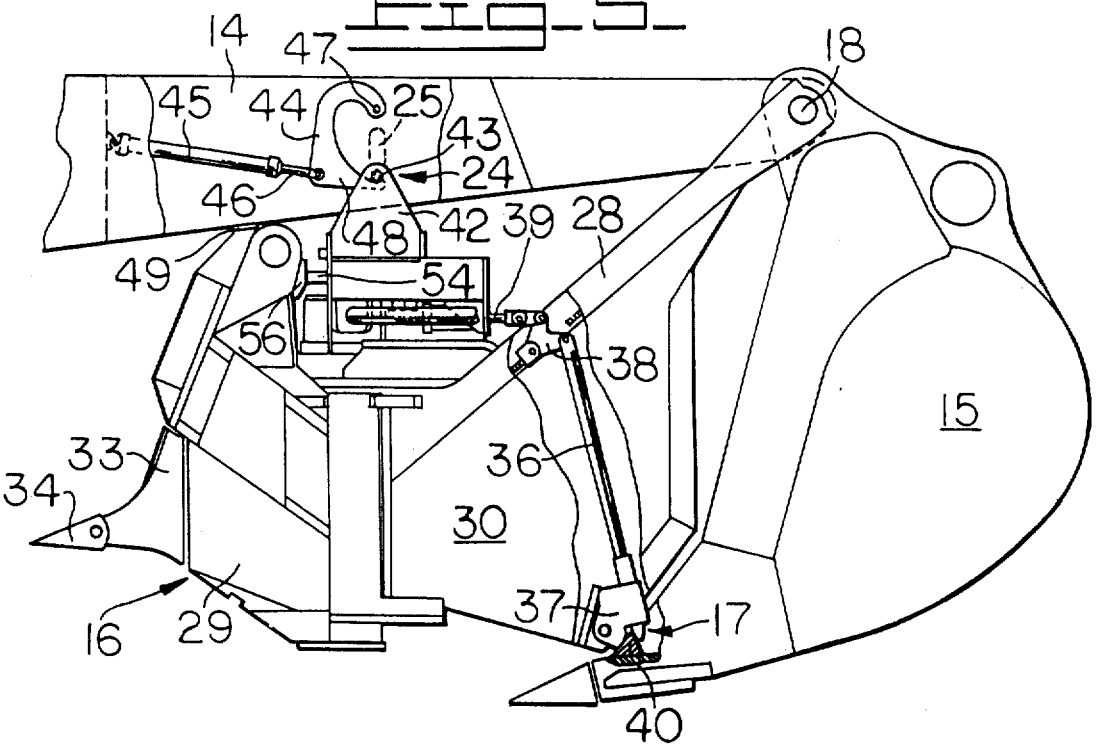
FIG. 5 is a side elevational view of the apparatus of the present invention with portions broken away to reveal details.

With reference now to FIG. 5, the latching mechanism 17 for locking the impact apparatus to the bucket includes a latching rod 36 connected to a pivotally mounted bracket 37 at one end and a pivotal yoke member 38 at the other end, which yoke is connected in a suitable manner to a hydraulically actuated cylinder 39. A locking detent member or wedge 40 is secured to the bucket as shown for engagement by the latching rod 36 to latch mechanism to the bucket. To operate the latch mechanism the hydraulic cylinder 39 is actuated pivoting the yoke member 38 forward, which forces the latching rod 36 and bracket 37 downward to engage behind and lock to wedge member 40. In order to unlatch the mechanism from the bucket the hydraulic cylinder 39 is deactivated, which pulls the yoke 38 backward and latching rod 36 and bracket 37 upward out of engagement with the wedge member 40.

The latching mechanism 24 for latching the impact material fracturing apparatus 16 to the stick includes a bracket 42 having a pin member 43 secured to the bracket for engaging slot 25, formed in stick 14. A C-shaped lock member 44 pivotally mounted at 47 to the stick 14 engages with the pin 43 for retaining the bracket 42 in the latched position. This latching mechanism is operated by means of a hydraulic cylinder 45 including piston rod 46 secured as illustrated to the C-shaped bracket 44. When the bucket 15 is swung upward as shown to swing the impact apparatus against the stick, pin 43 engages slot 25 on the stick. Actuation of hydraulic cylinder 45 then forces the piston rod 46 forward and pivots C-shaped lock member 44 around pivot point 47, forcing the C-shaped member's lower leg 48 to engage pin 43 and pull the entire mechanism upward against the stick until a stop member 49 engages the lower surface of the stick.

Hydraulic pressure is maintained in the cylinder 45 as long as the mechanism is in the latched position, as shown in FIG. 5 to provide a fail-safe lock system. This latching mechanism as shown, 17 and 24, is duplicated on the other side of the bucket and stick. The fail-safe lock system is provided between latch mechanisms 17 and 24 in order to ensure that the impact material-fracturing apparatus 16 is securely latched to the stick, by the latch mechanism 24 before the latching rods 36 can be unlocked from the bucket. This prevents the bucket from swinging away from the impact device without its being securely latched to the stick. The interlock device also prevents the latch member 24 from being unlocked until the latching rod 36 is securely locked to the bucket. This fail-safe latching and unlatching is accomplished through sequencing of various valves within the hydraulic circuit not shown.

Figure 6:
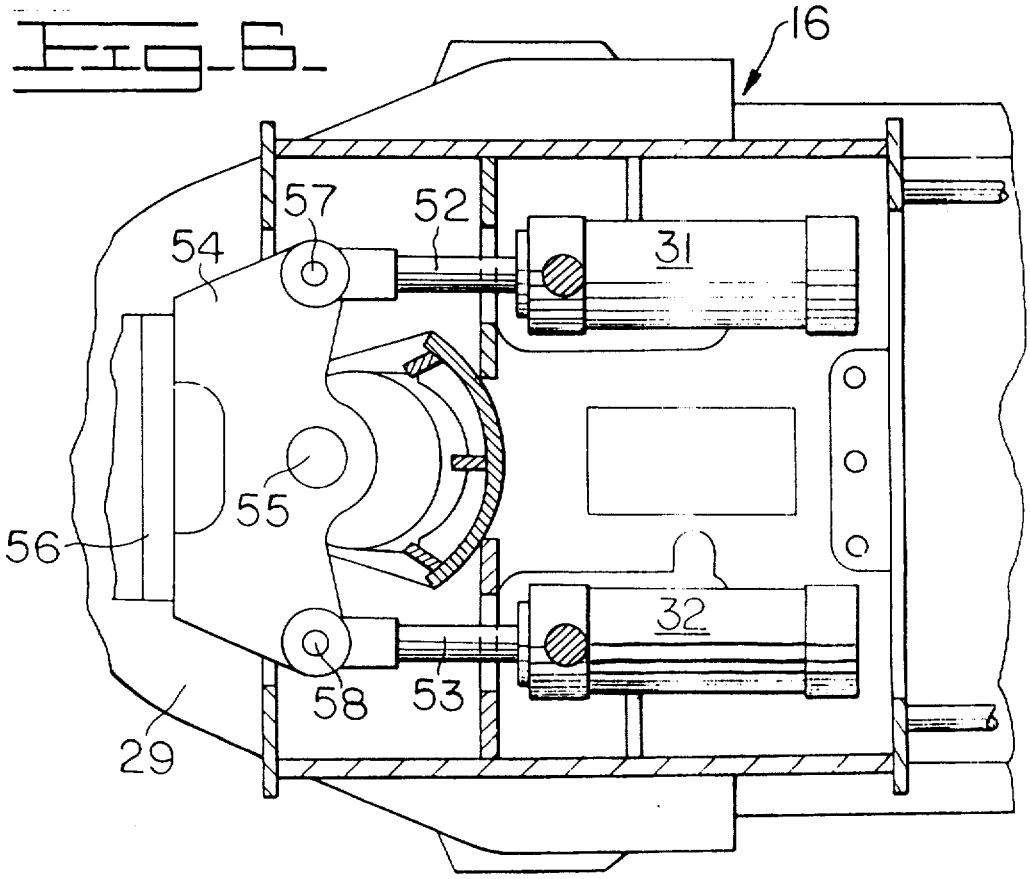
FIG. 6 is a sectional view of a portion of the apparatus of FIG. 5.

Turning now to FIG. 6, there is illustrated the mechanism for rotating or swinging the housing 29 about its pivot point with respect to the housing 30. This assembly includes a pair of hydraulic cylinders 31 and 32 which are pivotally connected by suitable rods 52 and 53 which are pivotally connected to a rotator plate 54 which in turn is pivotally mounted within housing 29 by suitable pivot pin or the like 55. The piston rods 52 and 53 are pivotally connected at 57 and 58 to the plate 54 which in turn engages a bracket 56 which is secured to the upper portion of the rotatable housing 29. Actuation of either one of the hydraulic motors 31 or 32 along with deactivation of the opposite motor pivots the housing 29 about the pivot support axis 55. This permits the apparatus to be pivoted about the pivot point 55 and the fracturing tool, as best seen in FIG. 4, to be swung to either side of the center line of the apparatus for engagement of walls to either side of the apparatus. This permits the engagement of the side walls of a trench or the cutting of a very wide trench through a rock or the like material. The shank can be pivoted up to 27° to either side of the center line thereof.

From the above description it is seen that there is described and illustrated a fracturing apparatus for mounting adjacent the bucket of an excavator with means for latching the apparatus into an operative and a non-operative position. The operative position is a position wherein the apparatus is latched to the bucket of the excavator for movement therewith and engagement with material to be broken or fractured. The non-operative position is a position in which the apparatus is pivoted against and latched to the stick of the excavator with the bucket then being free to operate in the usual manner. The fracturing apparatus is mounted and includes swivel means permitting the fracturing tool to swing to either side of the device for engaging side walls or the like to the sides of the apparatus.

While the present invention has been described by means of a single embodiment it is to be understood that numerous changes and modifications may be made therein without departing from the spirit and scope of the present invention as defined in the appended claims.

What is claimed is:

1. Material-fracturing apparatus for mounting adjacent the bucket of an excavator having a boom and a stick, said apparatus comprising:

a housing having a fracturing shank supported by and extending therefrom and means for applying impact blows to said shank for breaking hardened materials;

bracket means extending from *and pivotally mounted to* said housing for pivotal connection to the stick of [an] *the* excavator adjacent the bucket of said excavator;

*an actuatable hydraulic cylinder pivotally connected to said housing and to said bracket means at locations sufficient for controllably, pivotally moving said housing relative to said bracket means for relative angular adjustment about an axis extending at substantially a right angle to the pivotal connection of said housing to said stick;* first latch means for latching said housing means to said bucket for manipulation of said fracturing device into operative position by manipulation of said bucket; and second latch means for latching said housing to said stick to permit free operation of said bucket.

2. The material-fracturing apparatus of claim 1 wherein the material-fracturing shank is mounted for angular adjustment relative to said bucket while latched thereto.

[3. The material-fracturing apparatus of claim 2 wherein said bracket means pivotally connects to said stick at the pivotal connection of said bucket thereto so that said housing and said bucket pivots about the same point on said stick.]

[4. The material-fracturing apparatus of claim 3 including means for preventing disengagement of said second latch means until said first latch means is latched to said bucket.]

[5. The material-fracturing apparatus of claim 4 wherein said bracket means extends from said housing in a direction opposite that of said fracturing shank.]

6. The material-fracturing apparatus of claim 1 wherein said bracket means pivotally connects to said stick at the pivotal connection of said bucket thereto so that said housing and said bucket [pivots] *pivot* about the same point on said stick.

7. The material-fracturing apparatus of claim 6 including means for preventing disengagement of said second latch means from said stick until said first latch means is latched to said bucket.

8. The material-fracturing apparatus of claim [7] *1* wherein said means for applying impact blows to said shank comprises a [machanical] *mechanical* impact device driven by a rotary hydraulic motor.

9. The apparatus of claim 8 wherein said rotary hydraulic motor is detachably secured to said housing and said second latch means is operative to latch said rotary motor to said stick so that said fracturing apparatus can be readily removed from said stick leaving said motor latched to said stick to thereby avoid the removal of hydraulic lines therefrom.

10. The material-fracturing apparatus of claim [7] *1* wherein said bracket means extends from said housing in a direction opposite that of said fracturing shank.

11. The material-fracturing device of claim 10 wherein said fracturing shank is mounted for relative angular adjustment about a generally vertical axis.

12. The material-fracturing apparatus of claim 11 wherein said bracket *means* extends at an angle of approximately 45° from said axis of angular adjustment.

13. The material-fracturing apparatus of claim 1 wherein said means for applying impact blows to said shank comprises a mechanical impact device driven by a rotary hydraulic motor.

14. The apparatus of claim 13 wherein said rotary hydraulic motor is detachably secured to said housing and said second latch means is operative to latch said rotary motor to said stick so that said fracturing apparatus can be readily removed from said stick.

[15. The material-fracturing device of claim 1 wherein said housing is pivotally mounted to said bracket for relative angular adjustment about an axis extending at substantially a right angle to the pivotal connection of said housing to said stick.]

16. The material-fracturing apparatus of claim [15] *1* wherein said bracket *means* extends at an angle of approximately 45° from said axis of angular adjustment.

17. Material-fracturing apparatus for mounting on a support arm adjacent an excavating bucket, said apparatus comprising:

a support arm having an excavating bucket pivotally connected to one end thereof;

a housing having a fracturing shank supported by and extending therefrom and means for applying impact blows to said shank for breaking hardened materials; *said fracturing shank being mounted for angular adjustment relative to said bucket while latched thereto;* bracket means extending from said housing for pivotal connection to the end of said support arm adjacent and forward of said bucket;

*an actuatable hydraulic cylinder pivotally connected to said housing and to said bracket means at locations sufficient for controllably, pivotally moving said fracturing shank;* first latch means for latching said housing means to said bucket for manipulation of said fracturing apparatus into operative position by manipulation of said bucket; and second latch means for latching said housing to said stick to permit free operation of said bucket.

[18. The material-fracturing apparatus of claim 17 wherein the material-fracturing shank is mounted for angular adjustment relative to said bucket while latched thereto.]

19. The material-fracturing apparatus of claim [18] *17* wherein said bracket means pivotally connects to said arm at the pivotal connection of said bucket thereto so that said housing and said bucket pivots about the same point on said stick.

20. The material-fracturing apparatus of claim 19 including means for preventing disengagement of said first latch means until said second latch means is securely latched to said arm.

21. The material-fracturing apparatus of claim 20 wherein said bracket means extends from said housing in a direction opposite that of said fracturing shank.

22. The material-fracturing device of claim [18] *17* wherein said relative angular adjustment is about an axis extending at substantially right angles to the pivotal connection of said housing to said arm.

23. The material-fracturing device of claim 22 wherein said bracket extends at an angle of approximately 45° from said axis of angular adjustment.

24. The material-fracturing apparatus of claim [22] *17* wherein said angle of adjustment is up to 40° to either side of a line defining zero adjustment thereof.

*25. The material-fracturing apparatus of claim 1, wherein the first latch means includes:*

*a locking detent member connected to the bucket;*

*a bracket pivotally connected to the material-fracturing apparatus;*

*a latching rod having first and second end portions and being connected at the first end portion to said bracket and controllably, pivotally movable between latched and unlatched positions in response to a force being exerted at the second end portion of said latching rod, said first end portion and the bracket being engaged with the locking detent member at the latched position and spaced from the locking detent member at the unlatched position.*

*26. The material-fracturing apparatus of claim 25, wherein the first latch means includes:*

*a yoke member pivotally connected to the bracket means and to the second end portion of the latching rod; and*

*a hydraulic cylinder having first and second ends and being connected at one end to the bracket means and at the other end to the yoke member at a location sufficient for moving the latching rod between the latched and unlatched positions.*

*27. The material-fracturing apparatus of claim 25, wherein the bracket controllably engages the locking detent member at a location on said locking detent member opposite to the latching rod.*

*28. The material-fracturing apparatus of claim 1, wherein the stick has a latch slot and the second latch means includes:*

*a bracket having a pin member and being connected to the material fracturing apparatus, said pin member being movable in the latch slot in response to the material fracturing apparatus being moved toward the stick; and*

*a "C" shaped lock member pivotally connected to the stick and controllably pivotally movable between an unlatched position at which said lock member is spaced from the latch slot and a latched position at which said lock member forcibly engages said pin member in the latch slot.*

*29. The material-fracturing apparatus of claim 28, wherein the second latch means includes a stop member connected to the material fracturing apparatus and positionable in contact with the stick in response to said lock member forcibly engaging the pin member in the latch slot.*

*30. The material-fracturing apparatus of claim 28, wherein the second latch means includes a hydraulic cylinder having first and second ends and being pivotally connected at one end to the lock member and at the other end to the stick and said lock member is pivotally movable in response to actuating said hydraulic cylinder.*

*31. The material-fracturing apparatus of claim 28, wherein the lock member has a lower leg positionable in engagement with the pin member in response to moving the lock member toward the latched position.*

*32. The material fracturing apparatus of claim 1 including a rotator plate pivotally mounted in said housing and defining a pivot support axis with said housing and wherein the hydraulic cylinder is pivotally connected to said housing at said rotator plate.*

*33. The material fracturing apparatus of claim 32 including a bracket secured to said housing and positioned in engagement with said rotator plate and wherein said housing pivotally moves about said pivot support axis in response to actuation of said hydraulic cylinder.*

*34. The material fracturing apparatus of claim 32 wherein said material fracturing apparatus has a center line passing through said pivot support axis and said fracturing shank is rotatable about* 40° to either side of said center line.

* * * * *